No. 853,477. PATENTED MAY 14, 1907.
O. SELG.
FAN.
APPLICATION FILED JAN. 31, 1907.
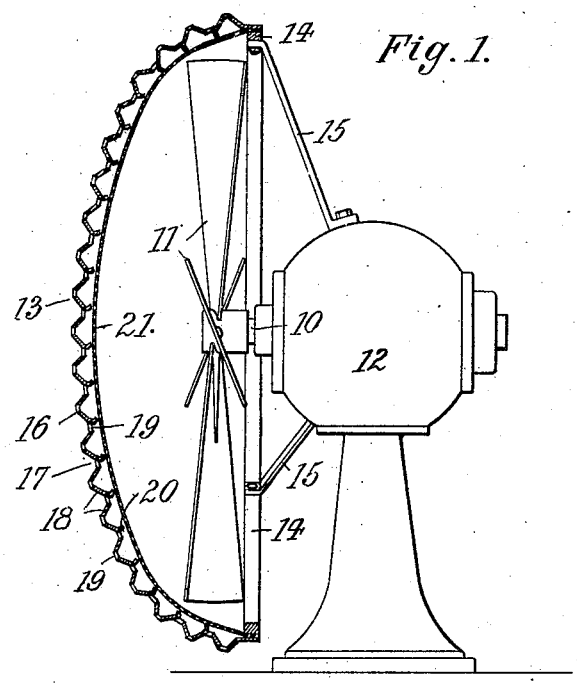
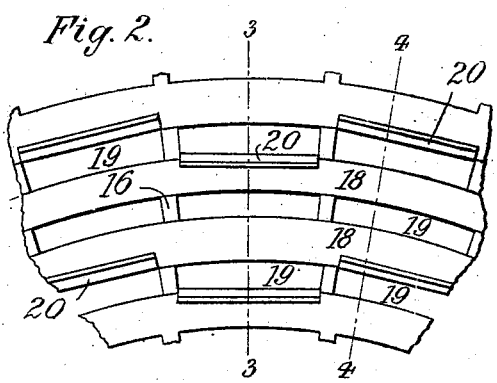 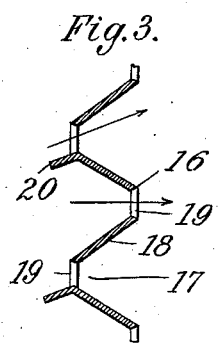 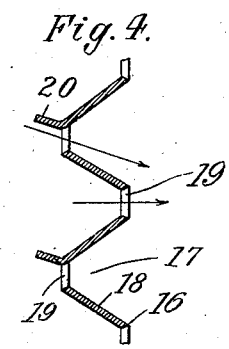
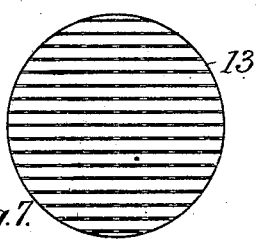 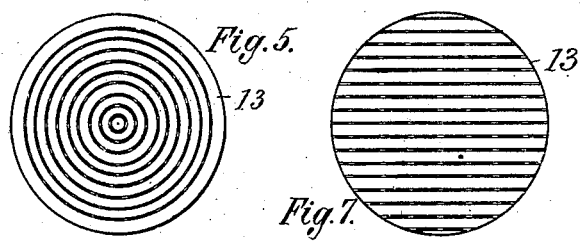 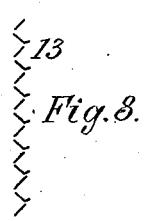
Witnesses:
Arthur E. Jumpe.
Adolph Hinel.
Inventor
Otto Selg,
By his Attorney
THE NORRIS PETERS CO., WASHINGTON, D. C.

UNITED STATES PATENT OFFICE.

OTTO SELG, OF NEW YORK, N. Y.

FAN.

No. 853,477.     Specification of Letters Patent.     Patented May 14, 1907.

Application filed January 31, 1907. Serial No. 364,979.

*To all whom it may concern:*

Be it known that I, OTTO SELG, a citizen of the United States, residing at New York city, Brooklyn, county of Kings, State of New York, have invented new and useful Improvements in Fans, of which the following is a specification.

This invention relates to a fan provided with improved means for so deflecting and dividing the air current, that it is evenly distributed over a large area, while objectionable draft is avoided.

In the accompanying drawing: Figure 1 is a side view of a fan provided with my improvement, showing the screen in section; Fig. 2 is a detail rear view of part of the screen; Fig. 3 a section on line 3—3, Fig. 2; Fig. 4 a section on line 4—4, Fig. 2; Fig. 5 a front view of a modification of the screen; Fig. 6 a cross section thereof; Fig. 7 a front view of a further modification of the screen, and Fig. 8 a cross section of Fig. 7.

The shaft 10 of the fan, carrying the blades 11, turns in the frame 12, and is preferably driven by electricity in the usual manner. In front of the blades 11, there is arranged a screen or air distributer 13 mounted on a ring 14, which is attached to frame 12 by arms 15.

Screen 13 is corrugated, being composed of a series of ridges 16 and intervening furrows 17, the ridges being made in the form of concentric rings. The sides 18 of the ridges are inclined to converge from base toward crest, the latter being flattened. Within each furrow there are formed a number of openings 19, shown to be made in the form of slots, and similar openings are formed in the crest of ridges 16. The screen being preferably struck up from sheet metal, the fins or projections 20, formed at the sides of the openings, are bent at various angles to serve as additional air distributers, adjoining projections extending preferably in opposite directions, (Figs. 3 and 4). If desired, a loosely woven textile covering 21 may be applied to either one or both sides of the screen, so as to extend over the same.

The air currents induced by the fan will, on striking the inner inclined sides of the corrugations, be so deflected as to pass through the outermost openings, not in a more or less axial direction, but at an infinite number of different angles. In other words, the more or less cylindrical body of the air current is converted into a more or less coniform body, thus spreading over an increased area. Furthermore, as these deflected air currents meet the more or less axially flowing currents passing through the inner perforations, a violent agitation of the air is produced. In this way the air is so disseminated, that a substantially uniform cooling effect is obtained, and objectionable draft is avoided.

The form and construction of the screen may be somewhat varied, without departing from the spirit of my invention. Thus, in Fig. 1, the screen is made of semi-oval form in cross section with concentric ridges. In Figs. 5 and 6, it is made coniform in cross section with concentric ridges, while in Figs. 7 and 8, it is made straight in cross section with straight ridges.

I claim:

1. A fan provided with a corrugated air distributing screen, substantially as specified 2. A fan provided with a corrugated air distributing screen having openings in its furrows, substantially as specified.

3. A fan provided with a corrugated air distributing screen having openings in its ridges, substantially as specified.

4. A fan provided with a corrugated air distributing screen having openings in its furrows and ridges, substantially as specified.

5. A fan provided with an air distributing screen having openings, and projections at the sides of such openings, substantially as specified.

6. A fan provided with a corrugated air distributing screen having openings, and projections at the sides of such openings, substantially as specified.

Signed by me at New York city, (Manhattan,) N. Y., this 30th day of January 1907.

OTTO SELG.

Witnesses:
WILLIAM SCHULZ,
FRANK V. BRIESEN.